United States Patent
Holmes et al.

(10) Patent No.: US 9,203,338 B2
(45) Date of Patent: Dec. 1, 2015

(54) ELECTRIC POWER ASSEMBLY FOR A VEHICLE

(71) Applicant: GM GLOBAL TECHNOLOGY OPERATIONS LLC, Detroit, MI (US)

(72) Inventors: Alan G. Holmes, Clarkston, MI (US); Paul F. Turnbull, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/959,196

(22) Filed: Aug. 5, 2013

(65) Prior Publication Data
US 2015/0035470 A1    Feb. 5, 2015

(51) Int. Cl.
| | |
|---|---|
| *H02P 1/46* | (2006.01) |
| *H02P 1/50* | (2006.01) |
| *H02P 3/18* | (2006.01) |
| *H02P 25/02* | (2006.01) |
| *H02K 19/12* | (2006.01) |

(52) U.S. Cl.
CPC .............. *H02P 25/021* (2013.01); *H02K 19/12* (2013.01)

(58) Field of Classification Search
CPC ........................ B60L 11/1803; Y02T 10/7241
USPC ...................................... 363/17, 15; 318/716
See application file for complete search history.

(56) References Cited

U.S. PATENT DOCUMENTS

| | | | | |
|---|---|---|---|---|
| 5,350,994 | A  * | 9/1994 | Kinoshita et al. | 320/116 |
| 6,262,896 | B1   | 7/2001 | Stancu et al. | |
| 6,384,559 | B2 * | 5/2002 | Egami | 318/500 |
| 6,617,820 | B2 * | 9/2003 | Carlson et al. | 318/727 |
| 7,582,978 | B2 * | 9/2009 | Flanigan et al. | 290/1 A |
| 2008/0223942 | A1 * | 9/2008 | Ishii et al. | 235/78 R |

* cited by examiner

*Primary Examiner* — Erick Glass
(74) *Attorney, Agent, or Firm* — Quinn Law Group, PLLC

(57) ABSTRACT

An electric power assembly for a vehicle is disclosed. An electric motor includes a stator and a rotor being rotatable about a pivot axis relative to the stator. An inverter is coupled to the electric motor and includes a power switching device that outputs an electrical signal from the inverter at a first frequency and having interference at a second frequency. The second frequency is a byproduct of the electrical signal creating the first frequency. The stator is electrically connected to the inverter to receive the first frequency such that the stator produces a first magnetic field. A frequency filter is attached to the rotor and directs the portion of the electrical signal having the second frequency to the rotor such that the rotor produces a second magnetic field that interacts with the first magnetic field to rotate the rotor about the pivot axis relative to the stator.

20 Claims, 2 Drawing Sheets

ELECTRIC POWER ASSEMBLY FOR A VEHICLE

TECHNICAL FIELD

The present disclosure relates to an electric power assembly for a vehicle.

BACKGROUND

Electric vehicles have been developed as an alternative to traditional gasoline engine vehicles. These electric vehicles can have an electric motor including a stator and a rotor rotatable relative to the stator. The rotor is attached to an output shaft and the output shaft is coupled to the wheels of the vehicle. Therefore, rotation of the rotor can cause rotation of the output shaft which rotates the wheels to move the vehicle.

SUMMARY

The present disclosure provides an electric power assembly for a vehicle. The assembly includes an electric motor. The electric motor includes a stator and a rotor being rotatable about a pivot axis relative to the stator. More specifically, in one embodiment, the rotor is spaced from the stator. The assembly also includes an inverter coupled to the electric motor. The inverter includes a power switching device that outputs an electrical signal from the inverter at a first frequency and having interference at a second frequency being greater than the first frequency. The second frequency is a byproduct of the electrical signal creating the first frequency. The stator is electrically connected to the inverter to receive the first frequency such that the stator produces a first magnetic field. The assembly further includes a frequency filter attached to the rotor, and in one embodiment, rotatable in unison with the rotor about the pivot axis. The frequency filter directs the portion of the electrical signal having the second frequency to the rotor such that the rotor produces a second magnetic field that interacts with the first magnetic field to rotate the rotor about the pivot axis relative to the stator.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
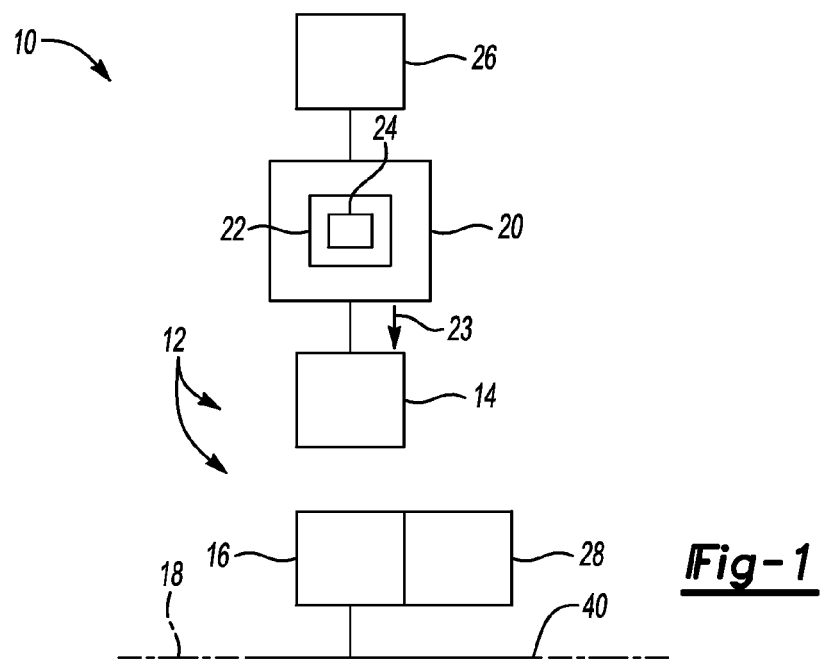
FIG. 1 is a schematic illustration of an electric power assembly for a vehicle.

Referring to the Figures, wherein like numerals indicate like or corresponding parts throughout the several views, an electric power assembly 10 for a vehicle is generally shown in FIG. 1. The electric power assembly 10 can be useful for vehicles, such as automotive vehicles, etc. For example, the electric power assembly 10 can be useful for automotive vehicles such as electric vehicles or hybrid vehicles. Specifically, the electric power assembly 10 can be useful for transmissions, such as electrically-variable transmissions, of electric vehicles or hybrid vehicles. It is to be appreciated that the electric power assembly 10 can also be useful for other vehicles including non-automotive applications, such as for example, farm, marine and aviation applications, etc.

As shown in FIG. 1, the electric power assembly 10 includes an electric motor 12. Generally, the electric motor 12 includes a stator 14 and a rotor 16 being rotatable about a pivot axis 18 relative to the stator 14. Generally, the rotor 16 can output a desired torque. In certain embodiments, the rotor 16 is spaced from the stator 14. Therefore, the rotor 16 can rotate independently of the stator 14. Simply stated, the stator 14 is not rotatable.

Continuing with FIG. 1, the electric power assembly 10 includes an inverter 20 coupled to the electric motor 12. Although omitted from FIG. 1 for simplicity, it is to be appreciated that the inverter 20 receives power from a direct current (DC) storage device, such as for example, a battery pack or a battery module, etc. The inverter 20 can produce a variable frequency to produce an alternating current voltage output (VAC) signal. Generally, the rotor 16 is spaced from the inverter 20, and therefore, the rotor 16 can rotate independently of the inverter 20. In certain embodiments, the inverter 20 can be a three-phase inverter 20.

The inverter 20 includes a power switching device 22 that outputs an electrical signal 23 from the inverter 20 at a first frequency and having interference at a second frequency being greater than the first frequency. The second frequency is a byproduct of the electrical signal 23 creating the first frequency. For example, the interference can be referred to as noise. Generally, the electrical signal 23 can be a periodic wave form, e.g. variable wave form. In certain embodiments, the first frequency is a low frequency signal and the second frequency is a high frequency signal, and therefore, the low frequency signal outputted from the inverter 20 is less than the high frequency signal. In other words, the low frequency signal (first frequency) is lower than the high frequency signal (second frequency). It is to be appreciated that the actual frequency values can vary as desired.

The power switching device 22 can include a plurality of transistors 24 operated in a pulse-width modulation (PWM) technique to output the electrical signal 23 at a desired frequency, such as the first frequency to produce the alternating current. Specifically, as shown in FIG. 1, the electric power assembly 10 can include a controller 26 in communication with the inverter 20 to signal the inverter 20 to operate the power switching device 22 to output the first frequency. Therefore, the controller 26 can signal the power switching device 22 to operate the transistors 24 in the PWM technique to output from the inverter 20 the electrical signal 23 at the desired frequency to produce the alternating current. It is to be appreciated that the controller 26 can be in communication with other components of the vehicle not specifically discussed herein.

The stator 14 is electrically connected to the inverter 20 to receive the first frequency such that the stator 14 produces a first magnetic field. Specifically, the stator 14 creates the first magnetic field when energized by the electrical signal 23 at the first frequency. The stator 14 is electrically connected to the inverter 20 to receive the electrical signal 23, i.e., the VAC waveform. In certain embodiments, the stator 14 can be wrapped coils or windings. It is to be appreciated that the coils of the stator can be formed of a conductive material, such as for example, copper or any other suitable conductive material.

Again, continuing with FIG. 1, the electric power assembly 10 also includes a frequency filter 28 attached to the rotor 16 and directs the portion of the electrical signal 23 having the second frequency to the rotor 16 such that the rotor 16 produces a second magnetic field that interacts with the first magnetic field to rotate the rotor 16 about the pivot axis 18 relative to the stator 14. Simply stated, the frequency filter 28 directs the second frequency to the rotor 16 such that the rotor 16 produces the second magnetic field that interacts with the first magnetic field to rotate the rotor 16 about the pivot axis 18 relative to the stator 14. Specifically, the rotor 16 creates the second magnetic field when energized by the second frequency. The frequency filter 28 receives or picks up the interference/noise which will be used by the rotor 16. The frequency filter 28 picks up a specific range of frequencies and attenuates frequencies outside of the specific range. For example, the second frequency can be configured within the specific range to be received or picked up by the frequency filter 28 while the first frequency can be outside the specific range and will not be received or picked up by the frequency filter 28. As such, the frequency filter 28 attenuates the first frequency while picking up the second frequency. Specifically, the frequency filter 28 resonates with the second frequency to energize the rotor 16 to produce the second magnetic field. Therefore, the first frequency passes to the stator 14 without the frequency filter 28 affecting the first frequency. In certain embodiments, the frequency filter 28 is rotatable in unison with the rotor 16 about the pivot axis 18. Furthermore, in certain embodiments, the frequency filter 28 can be further defined as a band-pass filter or a tank-circuit.

Figure 2:
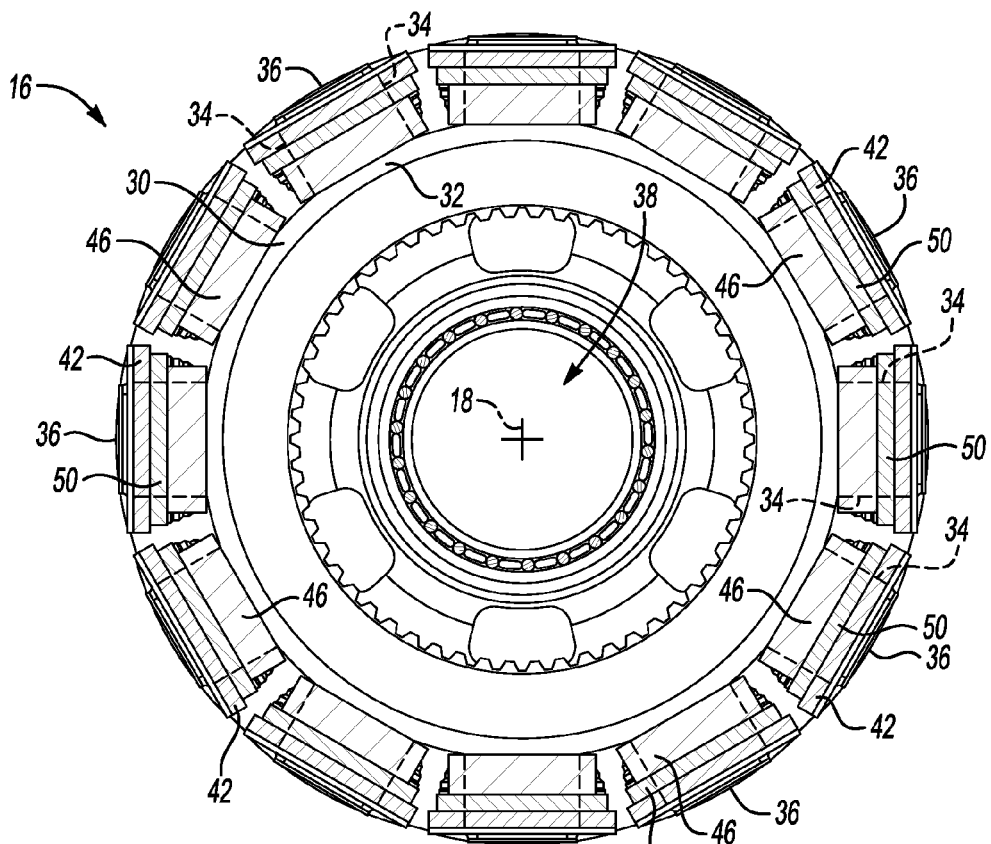
FIG. 2 is a schematic illustration of a rotor with a primary coil, a secondary coil and a field coil in cross-section.

Turning to FIG. 2, generally, the rotor 16 can include a support 30. The support 30 can carry magnetic flux. The support 30 can include a body 32 and a stem 34 extending outwardly from the body 32 and away from the pivot axis 18. In certain embodiments, the stem 34 is further defined as a plurality of stems 34 spaced from each other. In one embodiment, the stems 34 are spaced from each other radially relative to the pivot axis 18. Furthermore, each of the stems 34 can extend to respective distal ends, with each of the distal ends including a bulge 36.

Generally, the support 30 is formed of a metal material. For example, the metal material of the support 30 can be steel or any other suitable metal material for carrying magnetic flux. Therefore, the support 30, including the body 32, the stem(s) 34, the bulge(s) 36, can each be formed of the metal material, such as steel. It is to be appreciated that the support 30 can be any suitable configuration and FIG. 2 is for illustrative purposes only.

Furthermore, as shown in FIG. 2, the support 30 can define a hole 38 along pivot axis 18. In one embodiment, the hole 38 is collinear with the pivot axis 18. A shaft 40 (see FIG. 1) can be disposed through the hole 38 and can engage the rotor 16 such that the rotor 16 and the shaft 40 rotate in unison about the pivot axis 18. Generally, rotation of the shaft 40 can be outputted to the wheels to move the vehicle. It is to be appreciated that other components are coupled between the shaft 40 and the wheels, such as for example, a differential mechanism, etc., to allow rotation of the wheels.

Figure 3:
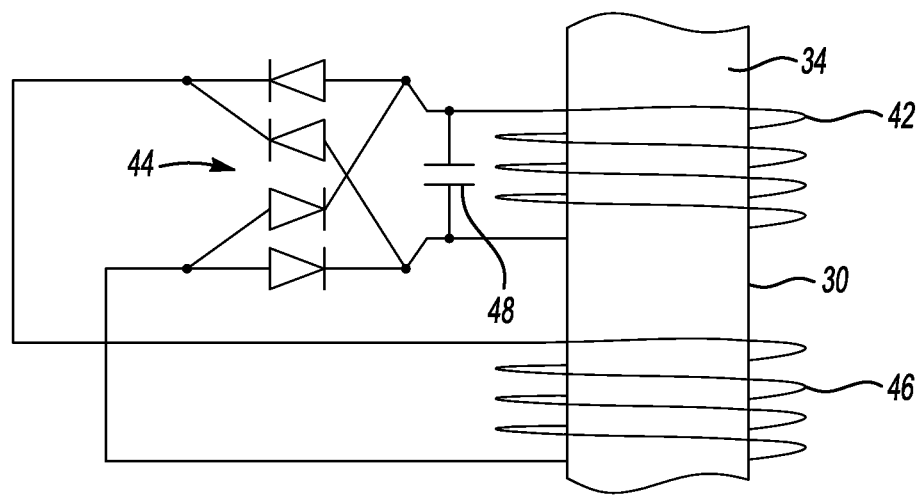
FIG. 3 is a schematic broken plan view of the primary coil, a rectifier and the field coil in one arrangement.
Figure 4:
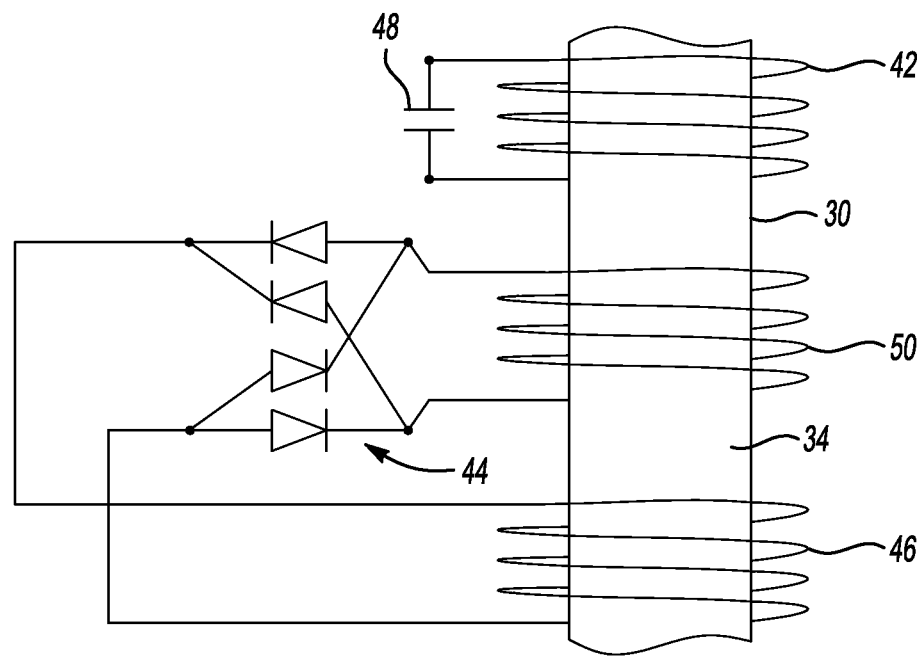
FIG. 4 is a schematic broken plan view of the primary coil, the rectifier and the field coil in another arrangement with the secondary coil.

Turning to FIGS. 2-4, in various embodiments, the frequency filter 28 can include a primary coil 42 wrapped around the support 30 to resonate with the second frequency. More specifically, the primary coil 42 is wrapped around the stem 34 and resonates with the high frequency signal being outputted from the inverter 20. As suggested by the rotor 16 being spaced from the inverter 20, the primary coil 42 is spaced from the inverter 20, and more specifically, the primary coil 42 is not physically connected to the inverter 20, e.g., by wires. In FIG. 2, the primary coil 42 is illustrated as a schematic cross-sectional block for illustrative purposes only and it is to be appreciated that the primary coil 42 can be wrapped around the stem 34 more than once. In certain embodiments, the primary coil 42 can abut the bulge 36 such that the bulge 36 maintains the primary coil 42 on the stem 34. It is to be appreciated that the primary coil 42 can be referred to as primary windings.

In certain embodiments, as shown in FIG. 2, the primary coil 42 is further defined as a plurality of primary coils 42, with one primary coil 42 wrapped around one stem 34 and another primary coil 42 wrapped around another stem 34, etc. As such, one bulge 36 maintains one primary coil 42 on one stem 34 and another bulge 36 maintains another primary coil 42 on another stem 34, etc.

Generally, the primary coil 42 can be formed of a conductive material. For example, the conductive material of the primary coil 42 can be copper or any other suitable conductive material. Therefore, for example, the primary coil 42 can be formed of a copper wire wrapped around the support 30, and more specifically, wrapped around the stem 34.

Referring to FIG. 3, the frequency filter 28 can also include a rectifier 44 electrically connected to the primary coil 42 to convert alternating current from the primary coil 42 into direct current. Generally, the rectifier 44 is electrically connected to the primary coil 42, e.g., by wires. In certain embodiments, the rectifier 44 is electrically connected to more than one of the primary coils 42, with the primary coils 42 electrically connected to each other in either a series electric circuit or a parallel electric circuit, and the primary coils 42 are electrically connected to the rectifier 44 in either a series electric circuit or a parallel electric circuit. In other words, the plurality of primary coils 42 are electrically connected to each other and to one rectifier 44 in either the series electrical circuit or the parallel electrical circuit. In yet another embodiment, the rectifier 44 is further defined as a plurality of rectifiers 44, with one rectifier 44 electrically connected to one of the primary coils 42 and another rectifier 44 electrically connected to another one of the primary coils 42, etc. FIG. 3 illustrates one stem 34 of the support 30 with one primary coil 42 and one rectifier 44, and therefore, it is to be appreciated that another stem 34, another primary coil 42 and another rectifier 44 are configured substantially the same as shown in FIG. 3 and will not be illustrated further.

Continuing with FIG. 3, the frequency filter 28 can further include a field coil 46 wrapped around the support 30 and electrically connected to the primary coil 42 through the rectifier 44 in a series electric circuit such that the field coil 46 interacts with the support 30 to produce the second magnetic field. In other words, the primary coil 42 resonates with the second frequency to produce the alternating current in the primary coil 42 that is converted into the direct current by the rectifier 44, and the direct current energizes the field coil 46 to produce the second magnetic field that passes through the support 30 to the rest of the rotor 16. Generally, in the embodiment of FIG. 3, the rectifier 44 is electrically connected to the field coil 46, e.g., by wires. In certain embodiments, the field coil 46 is disposed closer to the pivot axis 18 than the primary coil 42. In other words, the field coil 46 is spaced from the bulge 36 such that the primary coil 42 is disposed between the field coil 46 and the bulge 36. In FIG. 2, the field coil 46 is illustrated as a schematic cross-sectional block to distinguish the primary coil 42 from the field coil 46 for illustrative purposes only and it is to be appreciated that the field coil 46 can be wrapped around the stem 34 more than once. It is to also be appreciated that the field coil 46 can be referred to as field windings.

In certain embodiments, as shown in FIG. 2, the field coil 46 is further defined as a plurality of field coils 46, with one field coil 46 wrapped around one stem 34 and another field coil 46 wrapped around another stem 34, etc. Generally, the field coil 46 can be formed of a conductive material. For example, the conductive material of the field coil 46 can be copper or any other suitable conductive material. Therefore, for example, the field coil 46 can be formed of a copper wire wrapped around the support 30, and more specifically wrapped around the stem 34. As such, the copper wire of the primary coil 42 is attached to the rectifier 44 and the copper wire of the field coil 46 is attached to the rectifier 44, with the rectifier 44 disposed between the primary coil 42 and the field coil 46.

Continuing with FIG. 3, in certain embodiments, the frequency filter 28 can include a capacitor 48 electrically connected to the primary coil 42. More specifically, the capacitor 48 can be disposed in one of a parallel electric circuit and a series electric circuit with the rectifier 44 downstream to the primary coil 42. Therefore, in one embodiment, the capacitor 48 is disposed in the parallel electric circuit with the rectifier 44 downstream to the primary coil 42 (see FIG. 3). In another embodiment, the capacitor 48 is disposed in the series electric circuit with the rectifier 44 downstream to the primary coil 42. Generally, the capacitor 48 is disposed between the primary coil 42 and the rectifier 44. In certain embodiments, the capacitor 48 is further defined as a plurality of capacitors 48, with one capacitor 48 electrically connected to one of the primary coils 42 and another capacitor 48 electrically connected to another one of the primary coils 42, etc. FIG. 3 illustrates one stem 34 of the support 30 with one primary coil 42, one rectifier 44 and one capacitor 48, and therefore, it is to be appreciated that another stem 34, another primary coil 42, another rectifier 44 and another capacitor 48 are configured substantially the same as shown in FIG. 3 and will not be illustrated further. It is to also be appreciated that more than one capacitor 48 can be utilized between one primary coil 42 and one rectifier 44. It is to further be appreciated that the capacitor(s) 48 can be in any suitable location. It is to also be appreciated that the capacitor(s) 48 can be further defined as a variable capacitor.

Referring to FIG. 4, in certain embodiments, the frequency filter 28 can include a secondary coil 50 wrapped around the support 30 and spaced from the primary coil 42. As such, the primary coil 42 and the secondary coil 50 are magnetically coupled to each other. Specifically, the support 30 carrying the magnetic flux cooperates with the primary coil 42 and the secondary coil 50 to magnetically couple together the primary coil 42 and the secondary coil 50. In other words, the primary coil 42 and the secondary coil 50 are not physically connected to each other, e.g., by wires. As discussed above, the primary coil 42 resonates with the second frequency which is utilized to magnetize the rotor 16. Generally, the secondary coil 50 changes an amount of voltage being output as direct current. As such, the secondary coil 50 can be referred to as a transformer.

One of the distinctions between FIGS. 3 and 4 is that FIG. 3 does not utilize the secondary coil 50 (transformer) and FIG. 4 utilizes the secondary coil 50 (transformer). As such, in the embodiment of FIG. 3, the amount of voltage being output as direct current from the field coil 46 remains substantially the same. It is to be appreciated that the secondary coil 50 can be referred to as secondary windings.

Another one of the distinctions between FIGS. 3 and 4 is the location of the rectifier 44. In the embodiment of FIG. 4, the rectifier 44 is electrically connected to the secondary coil 50 to convert alternating current from the secondary coil 50 into direct current. The number of turns the secondary coil 50 is wrapped around the stem 34 will change the amount of voltage being outputted from the field coil 46 as direct current. In certain embodiments, the secondary coil 50 is disposed closer to the pivot axis 18 than the primary coil 42. In other words, the secondary coil 50 is spaced from the bulge 36 such that the primary coil 42 is disposed between the secondary coil 50 and the bulge 36. In FIG. 2, the secondary coil 50 is illustrated as a schematic cross-sectional block to distinguish the primary coil 42 and the field coil 46 from the secondary coil 50 for illustrative purposes only and it is to be appreciated that the secondary coil 50 can be wrapped around the stem 34 more than once. It is to be appreciated that the secondary coil 50 is optional and is eliminated in the embodiment of FIG. 3.

In certain embodiments, as shown in FIG. 2, the secondary coil 50 is further defined as a plurality of secondary coils 50, with one secondary coil 50 wrapped around one stem 34 and another secondary coil 50 wrapped around another stem 34, etc. Furthermore, the secondary coil 50 can be formed of a conductive material. For example, the conductive material of the secondary coil 50 can be copper or any other suitable conductive material. Therefore, for example, the secondary coil 50 can be formed of a copper wire wrapped around the support 30, and more specifically, wrapped around the stem 34. As such, the copper wire of the secondary coil 50 is attached to the rectifier 44 and the copper wire of the field coil 46 is attached to the rectifier 44, with the rectifier 44 disposed between the secondary coil 50 and the field coil 46. FIG. 4 illustrates one stem 34 of the support 30 with one primary coil 42, one rectifier 44, one secondary coil 50, one field coil 46 and one capacitor 48, and therefore, it is to be appreciated that another stem 34, another primary coil 42, another rectifier 44, another secondary coil 50, another field coil 46 and another capacitor 48 are configured substantially the same as shown in FIG. 4 and will not be illustrated further.

In addition, in the embodiment of FIG. 4, the field coil 46 is wrapped around the support 30 and electrically connected to the secondary coil 50 through the rectifier 44 in a series electric circuit such that the field coil 46 interacts with the support 30 to produce the second magnetic field. In other words, the primary coil 42 resonates with the second frequency to produce the alternating current in the primary coil 42 that magnetically interacts with the secondary coil 50 to produce a complementary alternating current at a different amount of voltage that is converted into the direct current by the rectifier 44, and the direct current energizes the field coil 46 to produce the second magnetic field that passes through the support 30 to the rest of the rotor 16. Generally, in the embodiment of FIG. 4, the rectifier 44 is electrically connected to the secondary coil 50 and the field coil 46, e.g., by wires. Furthermore, in this embodiment, the capacitor 48 is electrically connected to the primary coil 42 and spaced from the secondary coil 50 and the field coil 46. Generally, in the embodiment of FIG. 4, the primary coil 42 is electrically connected to the capacitor 48, e.g., by wires, and thus, the capacitor 48 is not physically connected to the secondary coil 50 and the field coil 46, e.g., by wires. It is to be appreciated that, for this embodiment, more than one capacitor 48 can be utilized with each of the primary coils 42 and the capacitor(s) 48 can be in any suitable location. Additionally, it is to be appreciated for this embodiment, the rectifier 44 can be electrically connected to more than one of the secondary coils 50, with the secondary coils 50 electrically connected to each other in either a series electric circuit or a parallel electric circuit, and the secondary coils 50 are electrically connected to the rectifier 44 in either a series electric circuit or a parallel electric circuit. In other words, the plurality of secondary coils 50 are electrically connected to each other and to one rectifier 44 in either the series electrical circuit or the parallel electrical circuit.

Therefore, the electric power assembly 10 can be utilized to rotate the rotor 16 by utilizing interacting magnetic fields. As such, the rotor 16 is rotatable without having any physical connection to the inverter 20 or to the stator 14. Additionally, the frequency filter 28 is adjustable to change the strength of the magnetic field of the rotor 16. Furthermore, the rotor 16 can be shut off as desired. In addition, the electric power assembly 10 can eliminate brushes and slip rings, as well as eliminate permanent magnets, which can reduce manufacturing costs.

As a non-limiting example, the rotor 16 of the electric power assembly 10 can rotate around the pivot axis 18 at a speed of 1,200 revolutions per minute (rpm) and can be configured with twelve magnetic poles or stems 34 as shown in FIG. 2, in which case the appropriate frequency for the inverter 20 to supply alternating current to the stator 14 to drive the rotor 16 would be 120 cycles per second (120 Hz). Electrical currents can be driven through the phase windings of the stator 14 with approximately sinusoidally varying amplitude and direction, and a fundamental frequency of 120 Hz by PWM operation of one or more power switching devices 22 within the inverter 20. To cause the currents in the stator 14 to approximate sine waves, the power switching devices 22 can be switched on periodically at a frequency of 12,000 Hz, dividing each intended sine wave into 100 intervals for modulation.

Continuing with this non-limiting example, the electrical signal 23 with the first frequency of 120 Hz is supplied to the electric motor 12, but the second frequency of 12,000 Hz is also present in the signal 23 as the byproduct of using PWM at that frequency. The portion of the electrical signal 23 with the first frequency of 120 Hz is used by the stator 14 to produce the first magnetic field rotating at 1,200 rpm, while the portion of the electrical signal 23 with the second frequency of 12,000 Hz is transmitted by the stator 14 to the rotor 16 and used by the frequency filter 28 and the rotor 16 to provide the second magnetic field which is fixed to the rotor 16 and interacts with the first magnetic field of the stator 14 to drive the rotor 16. As the speed of the rotor 16 varies from 1,200 rpm, the first frequency varies from 120 Hz proportionally to control the rotation of the first magnetic field, while the second frequency of 12,000 Hz can be varied independently within the band of the frequency filter 28 to control the strength of the second magnetic field.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An electric power assembly for a vehicle, the assembly comprising:
   an electric motor including a stator and a rotor being rotatable about a pivot axis relative to the stator;
   an inverter coupled to the electric motor and including a power switching device that outputs an electrical signal from the inverter at a first frequency and having interference at a second frequency being greater than the first frequency, and wherein the second frequency is a byproduct of the electrical signal creating the first frequency, and with the stator electrically connected to the inverter to receive the first frequency such that the stator produces a first magnetic field; and
   a frequency filter attached to the rotor and directs the portion of the electrical signal having the second frequency to the rotor such that the rotor produces a second magnetic field that interacts with the first magnetic field to rotate the rotor about the pivot axis relative to the stator.

2. An assembly as set forth in claim 1 wherein the rotor includes a support and the frequency filter includes a primary coil wrapped around the support to resonate with the second frequency.

3. An assembly as set forth in claim 2 wherein the frequency filter includes a rectifier electrically connected to the primary coil to convert alternating current from the primary coil into direct current.

4. An assembly as set forth in claim 3 wherein the frequency filter includes a field coil wrapped around the support and electrically connected to the primary coil through the rectifier in a series electric circuit such that the field coil interacts with the support to produce the second magnetic field.

5. An assembly as set forth in claim 3 wherein the frequency filter includes a capacitor disposed in one of a parallel electric circuit and a series electric circuit with the rectifier downstream to the primary coil.

6. An assembly as set forth in claim 4 wherein the support is formed of steel, the primary coil is formed of copper and the field coil is formed of copper.

7. An assembly as set forth in claim 2 wherein the frequency filter includes a secondary coil wrapped around the support and spaced from the primary coil.

8. An assembly as set forth in claim 7 wherein the frequency filter includes a rectifier electrically connected to the secondary coil to convert alternating current from the secondary coil into direct current, with the secondary coil changing an amount of voltage being output as direct current.

9. An assembly as set forth in claim 8 wherein the frequency filter includes a field coil wrapped around the support and electrically connected to the secondary coil through the rectifier in a series electric circuit such that the field coil interacts with the support to produce the second magnetic field.

10. An assembly as set forth in claim 9 wherein the frequency filter includes a capacitor electrically connected to the primary coil.

11. An assembly as set forth in claim 9 wherein the support is formed of steel, the primary coil is formed of copper, the secondary coil is formed of copper and the field coil is formed of copper.

12. An assembly as set forth in claim 1 wherein the frequency filter is further defined as a band-pass filter.

13. An assembly as set forth in claim 1 further including a controller in communication with the inverter to signal the inverter to operate the power switching device to output the first frequency.

14. An electric power assembly for a vehicle, the assembly comprising:
- an electric motor including a stator and a rotor being spaced from the stator and rotatable about a pivot axis relative to the stator;
- an inverter coupled to the electric motor and including a power switching device that outputs an electrical signal from the inverter at a first frequency and having interference at a second frequency being greater than the first frequency, and wherein the second frequency is a byproduct of the electrical signal creating the first frequency, and with the stator electrically connected to the inverter to receive the first frequency such that the stator produces a first magnetic field; and
- a frequency filter attached to the rotor and rotatable in unison with the rotor about the pivot axis, and wherein the frequency filter directs the portion of the electrical signal having the second frequency to the rotor such that the rotor produces a second magnetic field that interacts with the first magnetic field to rotate the rotor about the pivot axis relative to the stator.

15. An assembly as set forth in claim 14 wherein the rotor includes a support and the frequency filter includes a primary coil wrapped around the support to resonate with the second frequency.

16. An assembly as set forth in claim 15 wherein the frequency filter includes a rectifier electrically connected to the primary coil to convert alternating current from the primary coil into direct current, and wherein the frequency filter includes a field coil wrapped around the support and electrically connected to the primary coil through the rectifier in a series electric circuit such that the field coil interacts with the support to produce the second magnetic field, and wherein the frequency filter includes a capacitor disposed in one of a parallel electric circuit and a series electric circuit with the rectifier downstream to the primary coil.

17. An assembly as set forth in claim 15 wherein the frequency filter includes a secondary coil wrapped around the support and spaced from the primary coil.

18. An assembly as set forth in claim 17 wherein the frequency filter includes a rectifier electrically connected to the secondary coil to convert alternating current from the secondary coil into direct current, with the secondary coil changing an amount of voltage being output as direct current and wherein the frequency filter includes a field coil wrapped around the support and electrically connected to the secondary coil through the rectifier in a series electric circuit such that the field coil interacts with the support to produce the second magnetic field, and wherein the frequency filter includes a capacitor electrically connected to the primary coil.

19. An assembly as set forth in claim 14 wherein the frequency filter is further defined as a band-pass filter.

20. An assembly as set forth in claim 14 further including a controller in communication with the inverter to signal the inverter to operate the power switching device to output the first frequency.

* * * * *